United States Patent [19]
Kapphahn

[11] Patent Number: 6,098,301
[45] Date of Patent: Aug. 8, 2000

[54] CHAIN MEASURING SYSTEM

[76] Inventor: John M. Kapphahn, Rte. 1, Box 85, Elbow Lake, Minn. 56531-9771

[21] Appl. No.: 09/070,939

[22] Filed: Apr. 30, 1998

[51] Int. Cl.[7] ........................................................ G01B 3/04
[52] U.S. Cl. ................................. 33/492; 33/732; 33/600
[58] Field of Search .............................. 33/492, 483, 700, 33/732, 600, 606; 235/1 R, 124

[56] References Cited

U.S. PATENT DOCUMENTS

| | | | |
|---|---|---|---|
| 1,933,446 | 10/1933 | Olson | 33/700 |
| 2,579,664 | 12/1951 | Gleasman | 33/492 |
| 3,805,390 | 4/1974 | Craig | 33/42 |
| 4,092,781 | 6/1978 | Blake | 33/812 |
| 4,151,652 | 5/1979 | Palma | 33/679.1 |
| 4,365,420 | 12/1982 | Walden | 33/679.1 |

*Primary Examiner*—Christopher W. Fulton
*Attorney, Agent, or Firm*—Michael S. Neustel

[57] ABSTRACT

A chain measuring system which allows quick and simple calculation of the number of links in various types of chains such as roller chain, saw chain or link chain. The inventive device includes an elongated member, a plurality of equally spaced notches within a side of the elongated member forming a plurality of pegs, each of the pegs having an arcuate end, a plurality of link count indicia within the elongated member and adjacent each notch, and a length indicia within the elongated member. The rollers of each link of a roller chain are removably positionable within the notches. The link count indicia indicate how many links are within the chain by the user simply viewing the link count indicia adjacent the last link. Preferably, the elongated member includes an augmented portion which provides space between the pegs and another surface such as a wall. In an alternative embodiment, a base member is attached traversely to the elongated member opposite of the plurality of notches for retaining the elongated member in a substantially upright position when positioned upon a flat surface.

17 Claims, 3 Drawing Sheets

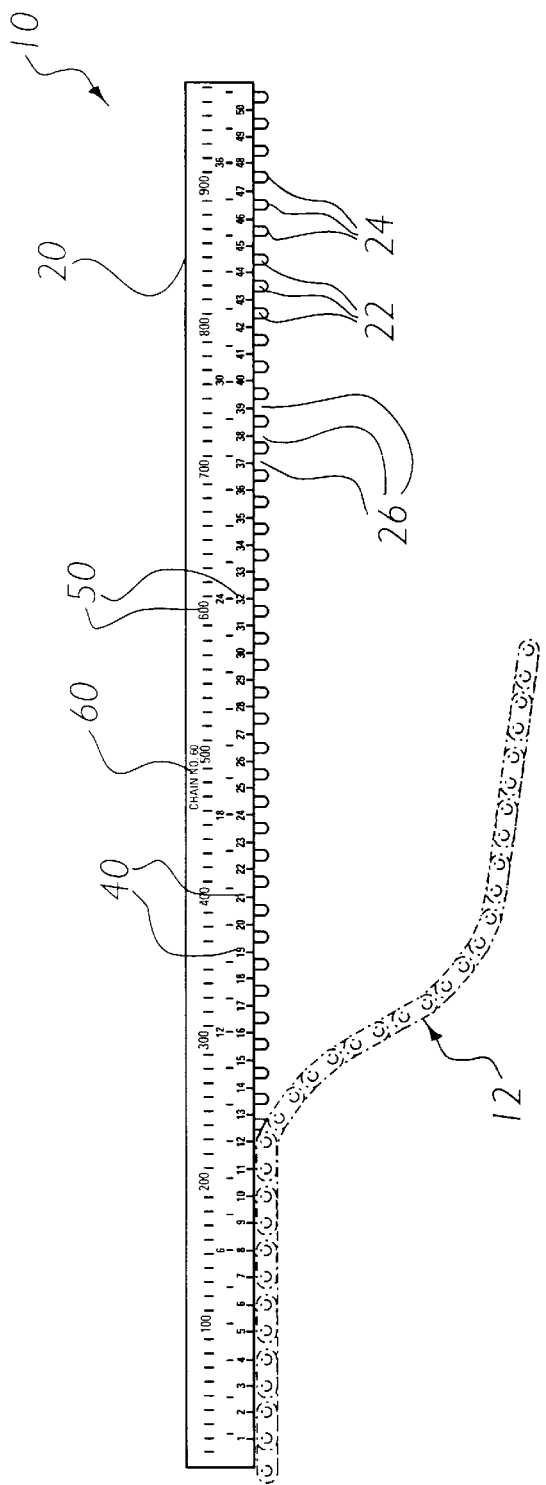
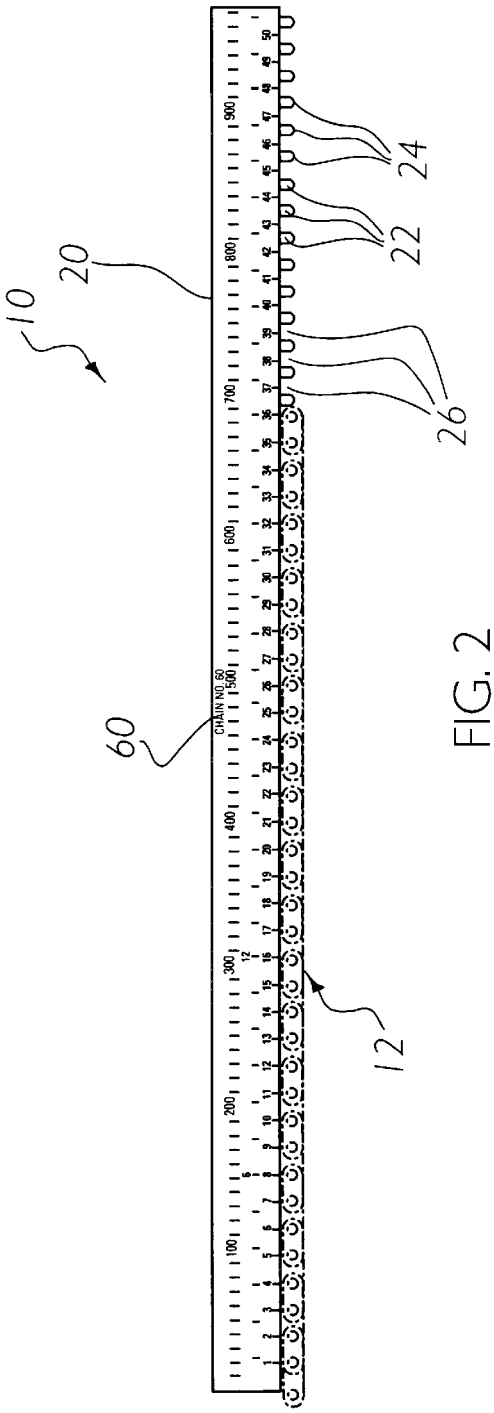
FIG. 1
FIG. 2

CHAIN MEASURING SYSTEM

BACKGROUND OF THE INVENTION

1. Field of the Invention

The present invention relates generally to chain counting devices and more specifically it relates to a chain measuring system which allows quick and simple calculation of the number of links in various types of chains such as roller chain, saw chain or link chain.

A particular problem in replacing a chain is making an accurate determination of the number of links within the chain. It is necessary to know exactly how many links which the chain to be replaced has in order to insure a proper fit of the chain. Usually, an individual has to manually count each link of the chain to be replaced. This method of counting the links is time consuming and is not guaranteed to be accurate because of human error.

Another method of calculating the number of links within the chain is to measure the overall length of the chain and divide the total length by the length of a link. This method usually does not provide an accurate count because the chain to be replaced will be longer than a new chain with the same number of links because of elongation and wearing of the links.

2. Description of the Prior Art

There are various types of chain counting devices. For example, U.S. Pat. No. 4,379,223 to Summers; U.S. Pat. No. 4,365,420 to Walden; U.S. Pat. No. 4,092,781 to Blake; U.S. Pat. No. 3,805,390 to Craig; U.S. Pat. No. 3,416,485 to Phillips; U.S. Pat. No. 3,209,463 to Schorr; U.S. Pat. No. 3,169,320 to Currie; U.S. Pat. No. 2,981,005 to Moe; U.S. Pat. No. 2,641,427 to Krogh; U.S. Pat. No. 2,622,603 to Claps all are illustrative of such prior art.

Summers (U.S. Pat. No. 4,379,223) discloses a universal chain link counting apparatus for mechanically counting the links of chain. Summers teaches the utilization of a frame rotatably supporting a plurality of sprockets within, a plurality of pegs mounted on each of the sprockets, and a counting mechanism in engagement with the pegs.

Walden (U.S. Pat. No. 4,365,420) discloses an apparatus for measuring the link characteristics of chains, including the total number of links. Walden teaches a semicircular holder having a recess and a plurality of sight holes, an elongated scale extending from the holder, and a semicircular shoe slidably mounted on the elongated scale.

Blake (U.S. Pat. No. 4,092,781) discloses an apparatus for measuring the elongation of chains due to joint wear. Blake teaches a first and second tube, a compression spring which forces the tubes apart, and a cylindrical indicator means for measuring the longitudinal travel of the second tube in relation to the first.

While these devices may be suitable for the particular purpose to which they address, they are not as suitable for allowing quick and simple calculation of the number of links in various types of chains such as roller chain, saw chain or link chain. The prior art inventions have many moving parts which are susceptible to wear and tear. The moving components are also prone to becoming contaminated by debris because of the relatively dirty environment the inventions are utilized in. Further, the prior art inventions are expensive to construct and maintain.

In these respects, the chain measuring system according to the present invention substantially departs from the conventional concepts and designs of the prior art, and in so doing provides an apparatus primarily developed for the purpose of allowing quick and simple calculation of the number of links in various types of chains such as roller chain, saw chain or link chain.

SUMMARY OF THE INVENTION

A primary object of the present invention is to provide a chain measuring system that will overcome the shortcomings of the prior art devices.

Another object is to provide a chain measuring system that quickly and simply calculates the number of links within a chain.

An additional object is to provide a chain measuring system that accurately measures the length of a chain regardless of the amount of wear and elongation of the chain.

A further object is to provide a chain measuring system that has no moving components.

Another object is to provide a chain measuring system that is not susceptible to wear and tear.

An additional object is to provide a chain measuring system that is inexpensive to construct.

A further object is to provide a chain measuring system which is removably mountable to a wall or table.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 is a side view of the present invention with a length of roller chain partially placed thereupon.

FIG. 2 is a side view of the present invention with the complete length of roller chain placed thereupon.

DESCRIPTION OF THE PREFERRED EMBODIMENT

Figure 3:
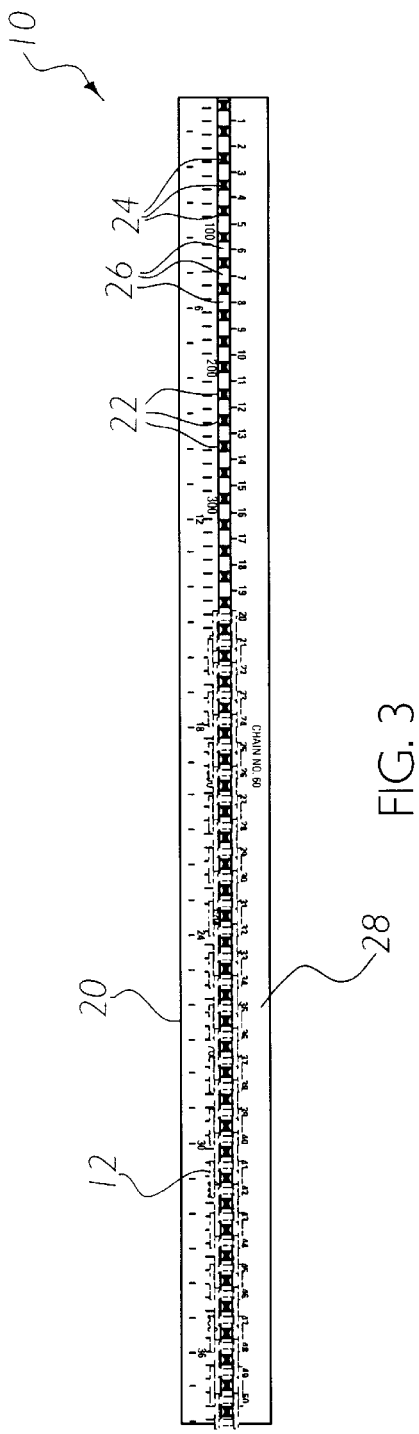
FIG. 3 is a top view of the present invention with the complete length of roller chain in engagement therewith.

Turning now descriptively to the drawings, in which similar reference characters denote similar elements throughout the several views FIGS. 1 through 6 illustrate a chain measuring system 10, which comprises an elongated member 20, a plurality of equally spaced notches 26 within a side of the elongated member 20 forming a plurality of pegs 22, each of the pegs 22 having an arcuate end 24, a plurality of link count indicia 40 within the elongated member 20 and adjacent each notch, and a length indicia 50 within the elongated member 20. The rollers of each link of a roller chain 12 are removably positionable within the notches 26. The link count indicia 40 indicate how many links are within the chain 12 by the user simply viewing the link count indicia 40 adjacent the last link. Preferably, the elongated member 20 includes an augmented portion 28 which provides space between the pegs 22 and another surface such as a wall. The chain measuring system 10 can be formed for various sizes of chain 12 ranging typically from #30 to #80.

As best shown in FIGS. 1 through 3 of the preferred embodiment, the elongated member 20 has three swaged sides. The elongated member 20 preferably is of a length sufficient to measure at least 50 links of a chain 12. The elongated member 20 may be constructed of plastic, wood, metal or various other suitable materials. Also, there are various well known attaching means for allowing attachment of a plurality of the elongated members 20 for allowing chains 12 having greater than 50 links to be measured. Examples of such attaching means include, but are not limited to, fasteners, hooks, dowels, and VELCRO.

The elongated member 20 preferably has an augmented portion 28 at least on one side of the plurality of notches 26 for providing spacing between the plurality of pegs 22 and another surface such as a wall, floor or bench top as best shown in FIG. 3 of the drawings. The elongated member 20 is removably mountable to various surfaces such as walls and bench tops. The elongated member 20 preferably includes at least one aperture within one end to allow a fastener to be inserted through for securing to a wall or bench top.

As best shown in FIGS. 1 and 2 of the drawings, a plurality of notches 26 project into one side of the elongated member 20. The plurality of notches 26 are equally spaced along the elongated member 20 and are large enough to receive a roller from a link in a roller chain 12. The plurality of notches 26 form a plurality of pegs 22 which extend from the elongated member 20. As best shown in FIGS. 1 and 2 of the drawings, each of the pegs 22 preferably has an arcuate end 24 for allowing the chain 12 to be effortlessly inserted and removed from the plurality of notches 26. The pegs 22 may also be tapered for increasing the ease of insertion and removal of the chain 12. The pegs 22 may also have a circular, square, rectangular, oval or any other cross-sectional area.

As best shown in FIG. 1 of the drawings, a plurality of link count indicia 40 are within at least one side of the elongated member 20. The link count indicia 40 are adjacent each notch for indicating the total number of links within the chain 12. The link count indicia 40 begins at one and continues preferably to 50. The plurality of link count indicia 40 may also be within the augmented portion 28 of the elongated member 20 as shown in FIG. 3 of the drawings. As shown in FIGS. 1 through 3 of the drawings, a plurality of length indicia 50 are within the elongated member 20 and the augmented portion 28 of the elongated member 20. The length indicia 50 provides length measurement of the chain 12 or other articles in both metric and standard units. This allows the chain measuring system 10 to also be utilized as a ruler also. Also, a size indicia 60 is positioned within the elongated member 20 for indicating to the user which size of chain 12 the chain measuring system 10 measures.

Figure 4:
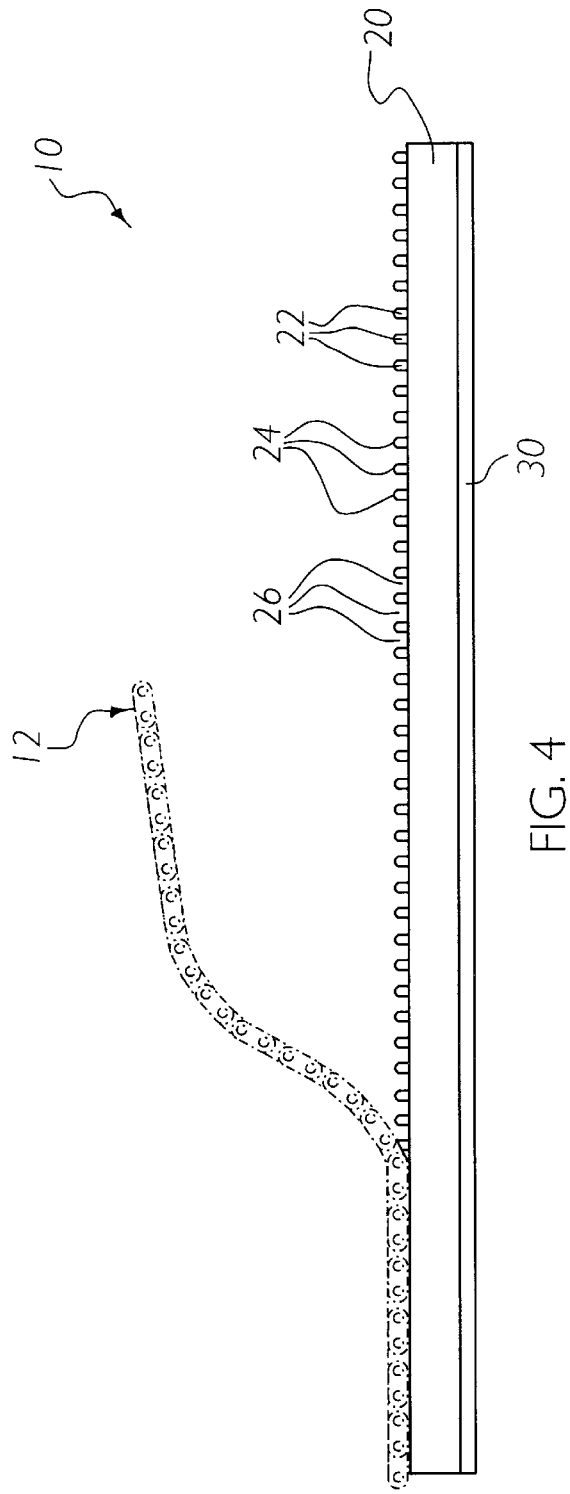
FIG. 4 is a side view of an alternative embodiment.
Figure 5:
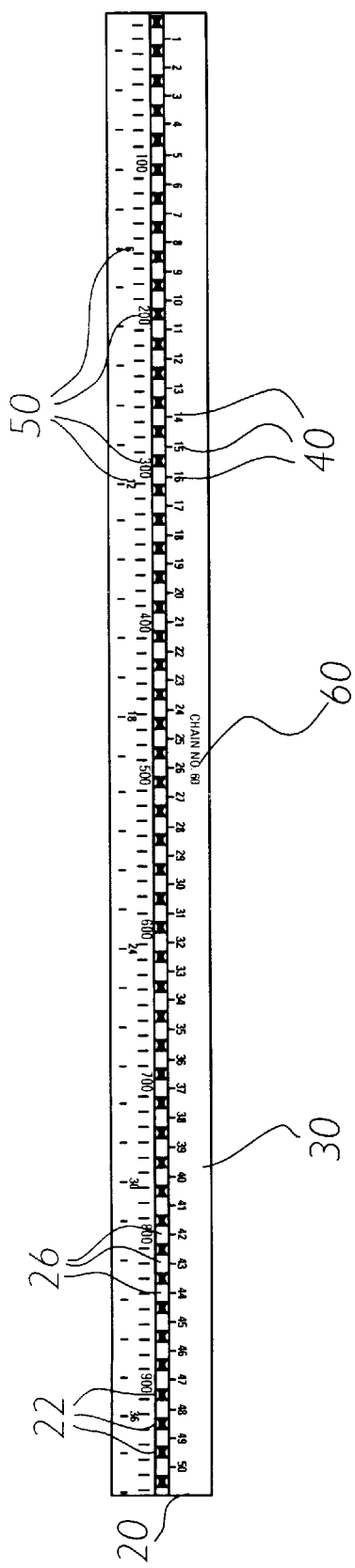
FIG. 5 is a top view of the alternative embodiment.
Figure 6:
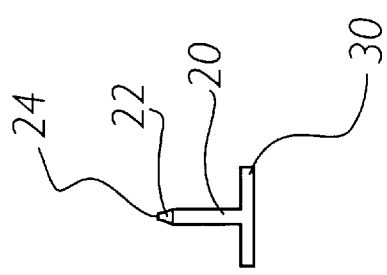
FIG. 6 is an end view of the alternative embodiment.

In an alternative embodiment as shown in FIGS. 4 through 6 of the drawings, a base member 30 is attached orthogonally to a side of the elongated member 20 opposite of the plurality of notches 26. The base member 30 supports the elongated member 20 vertically when placed upon a floor or bench top. The base member 30 also includes the link count indicia 40, length indicia 50 and the size indicia 60.

In a third embodiment, a plurality of substantially parallel rows of notches 26 project into an end of the elongated member 20. The rows of notches 26 could also be on different sides of the elongated member 20. Each row of notches 26 is spaced for a specific size of chain. For example, an elongated member 20 could have a row of notches 26 for #30 chain and another row of notches 26 for #80 chain.

In use, the user manually manipulates the end of the chain 12 adjacent the first link count indicia 40. The user then manipulates the chain 12 so that the rollers are inserted into the notches 26 within the elongated member 20. After the distal end of the chain 12 has been positioned within the notches 26, the user views the link count indicia 40 adjacent the distal end of the chain 12. This link count indicia 40 indicates the total number of links within the chain 12, regardless of how worn or elongated the chain 12 may be. When finished, the user simply removes the chain 12 from the notches 26 within the elongated member 20. If a chain 12 longer than the elongated member 20 is to be measured, the user must either mark the last link measured by the chain measuring system 10 and measure again with that position at the beginning, or a plurality of the elongated members 20 must be positioned end to end so that a complete calculation of the total number of links may be calculated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A chain measuring system comprising:

an elongated member;

a plurality of notches projecting into a side of said elongated member which receive a plurality of links from a chain; and a plurality of link count indicia within said elongated member corresponding to said plurality of notches which represent a number of links within said chain.

2. The chain measuring system of claim 1, wherein said plurality of notches are equally spaced apart for receiving a specified size of said chain.

3. The chain measuring system of claim 2, wherein said plurality of notches form a plurality of pegs.

4. The chain measuring system of claim 3, wherein said plurality of link count indicia are adjacent said plurality of notches.

5. The chain measuring system of claim 4, wherein said plurality of pegs have arcuate ends.

6. The chain measuring system of claim 5, wherein said plurality of pegs are tapered.

7. The chain measuring system of claim 6, wherein said elongated member includes a length indicia which represents metric and standard units of length.

8. The chain measuring system of claim 7, wherein said elongated member includes a size indicia which represents said specified size of said chain.

9. The chain measuring system of claim 1, wherein said elongated member includes an augmented portion substantially parallel to said plurality of pegs.

10. A chain measuring system comprising:

an elongated member;

a plurality of notches projecting into a side of said elongated member which receive a plurality of links from a chain;

a base member attached to said elongated member; and a plurality of link count indicia within said elongated member corresponding to said plurality of notches which represent a number of links within said chain.

11. The chain measuring system of claim 10, wherein said plurality of notches are equally spaced apart for receiving a specified size of said chain.

12. The chain measuring system of claim 11, wherein said plurality of notches form a plurality of pegs.

13. The chain measuring system of claim 12, wherein said plurality of link count indicia are adjacent said plurality of notches.

14. The chain measuring system of claim 13, wherein said plurality of pegs have arcuate ends.

15. The chain measuring system of claim 14, wherein said plurality of pegs are tapered.

16. The chain measuring system of claim 15, wherein said elongated member includes a length indicia which represents metric and standard units of length.

17. The chain measuring system of claim 16, wherein said elongated member includes a size indicia which represents said specified size of said chain.

* * * * *